Aug. 22, 1961 G. A. ARGABRITE 2,997,589
RADIATION DOSIMETER
Filed June 12, 1959
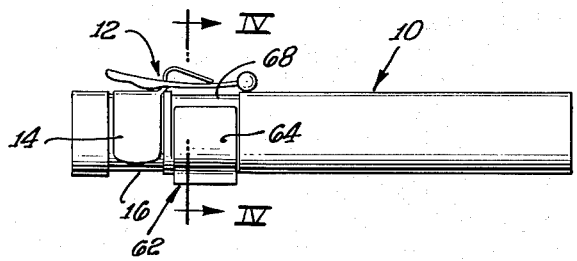
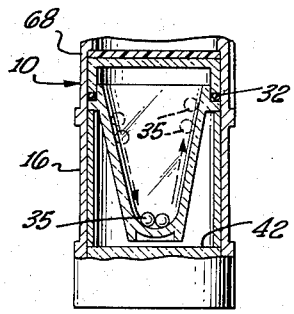
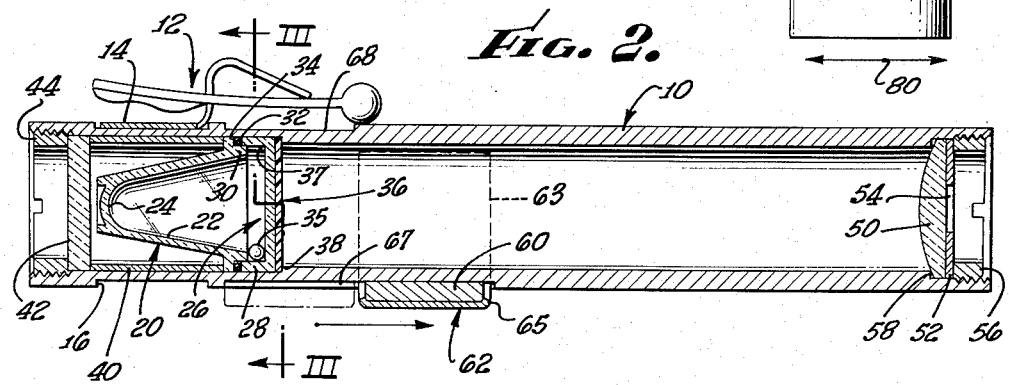
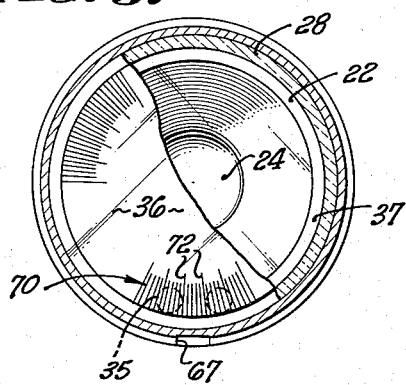
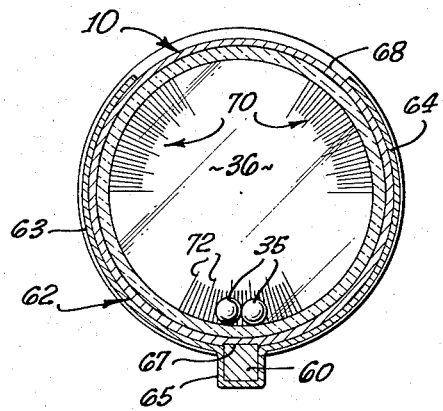
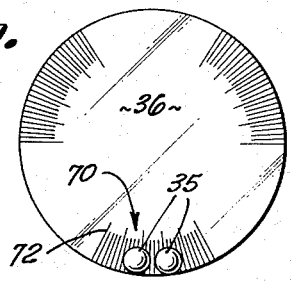
INVENTOR.
GEORGE A. ARGABRITE
BY
Miketta and Glenny
ATTORNEYS.

2,997,589
RADIATION DOSIMETER
George A. Argabrite, Malibu, Calif., assignor to Pacific Transducer Corp., Los Angeles, Calif., a corporation of California
Filed June 12, 1959, Ser. No. 819,979
9 Claims. (Cl. 250—83.3)

The present invention relates generally to an apparatus for visually indicating the cumulative dosage of exposure to ionizing radiation and more particularly relates to a device having a hollow hermetically enclosed ionizing chamber containing an ionizable medium and a plurality of movable elements, the elements being chargeable electrostatically and the repulsive force between such elements being availed of in measuring the amount of radiation to which the device has been exposed.

In the preferred embodiment of the invention hereinafter illustrated and described there is provided a hollow body made of a dielectric material having a very high specific resistivity. The material should be transparent, or at least translucent, and a plastic material such as polystyrene is accordingly satisfactory. Within the body chamber there is provided a pair of movable indicating elements, preferably spherical in order to facilitate smooth rolling movement within the chamber. The indicating elements are electrostatically chargeable in the same polarity relative to the material of the body. Desirably the chamber includes a generally annular raceway for restricting the movement of the indicating elements when a reading is taken. One or more sets of indicia are provided in association with the raceway, the indicia including markings for indicating the distance between the movable members resulting from electrostatic repulsive force.

The preferred form of the device includes a self-contained optical viewing system to facilitate rapid and accurate reading of the instrument.

Means are provided in accordance with the present invention for retaining the movable indicating elements immobilized within the raceway and thus eliminate erroneous indications resulting from partial recharging of the instrument caused by random movement of the movable elements. Thus the movable elements may be made of ferromagnetic material such as soft iron and the locking means can then take the form of a permanent magnet adapted to be selectively moved by the operator into either a locking position wherein the magnet retains the spheres locked within the raceway or a release position out of magnetic relation with the spheres. In the latter position the indicating elements or spheres can then assume their relative positions as indicated by the physical dimensions and configuration of the raceway and the electrostatic repulsion existing between the elements.

The device of the present invention can be made with any desired sensitivity within a fairly broad range, such as from 100 milliroentgens up to 20 roentgens or even higher. The sensitivity of the device depends upon the size of the spherical indicating elements within the raceway and the size of the ionization chamber of which the raceway forms a part. Furthermore, the range of the instrument may be materially changed by altering the material and the thickness of the housing of the device, taking advantage of the well-known fact that different materials exhibit vastly different coefficients of transmission to ionizing radiation such as gamma and X-rays. Keeping all other factors unchanged, the larger the volume enclosed within the chamber, the higher will be the sensitivity of the instrument. Variation of the size of the indicating elements changes the range of the instrument by increasing the range with an increase in the radius of the elements.

The instrument is charged by moving it fairly vigorously in an oscillatory manner at the rate of 100 oscillations or more per minute in such a direction and with such orientation that the spherical balls move about within the chamber in substantially random paths. Such movement, in accordance with well-known electrostatic laws, tends to create upon a ball and the inner dielectric wall of the housing chamber electrostatic charges of opposite polarity. The charges thus created upon the inner surface of the housing cannot become discharged by movement of the balls within the chamber unless one of the balls happens to run over the exact spot on the inner surface of the wall where a charge exists. I have found that by charging the device in this way the instrument fairly quickly assumes a saturated condition, since apparently further movement of the balls relative to the chamber walls results in discharging one of the elemental charges on the chamber wall and the approximate simultaneous creation of another charge on the wall.

Operation of the present device is believed to depend upon the ionizing of molecules of the gaseous medium within the chamber by radiation passed therethrough, the ions thus formed serving to discharge an elemental charge from the indicating elements and chamber wall. Thus the gas inclosed within the chamber must be an ionizable medium, and it should also be dry, since a comparatively small amount of moisture is sufficient to throw the device completely out of calibration. By preference one of the inert gases such as neon, argon, nitrogen or the like is used.

Accordingly it is the principal object of the present invention to disclose a novel radiation dosimeter including movable indicating elements housed within a hermetically tight chamber containing an ionizable medium, the indicating elements being electrostatically chargeable in order to repel one another. Other objects and purposes are to disclose a device of this nature wherein the chamber includes a virtually annular raceway wherein the movable members within the chamber may freely move; to disclose in such a device indicia disposed in association with the raceway, the chamber being transparent, whereby to permit the user to observe the amount of separation between the indicating elements resulting from electrostatic repulsion therebetween; to provide in a device of this character a simple but reliable optical system for ease of viewing by the user so that no external optical viewing or measuring equipment is needed; to provide such a device wherein no external charging apparatus is needed; and to disclose a light weight, easily portable device having the foregoing advantageous characteristics which may be easily and economically manufactured whereby to permit wide distribution of the devices in the event of national need. Other advantages and purposes of the invention will become clear from the study of the following description of a preferred embodiment thereof taken in connection with the accompanying drawing in which:

FIG. 1 is a side elevational view of a preferred form of radiation dosimeter embodying the present invention, the movable magnetic keeper being shown in locking or ball-retaining position.

FIG. 2 is a longitudinal sectional view, on an enlarged scale, of the device of FIG. 1 with the magnetic keeper shown in locking position in dotted outline and in release position in solid lines.

FIG. 3 is a sectional view taken along the broken line III—III of FIG. 2, the instrument being shown as indicating a fully charged condition.

FIG. 3A is a view of the indicia and indicating elements only showing a reading corresponding to four-fifths discharge.

FIG. 4 is a sectional view taken along line IV—IV of

FIG. 1 showing the spherical indicating members locked in non-indicating position.

FIG. 5 is a fragmentary view of the end of the device containing the ionization chamber, the device being shown in vertical orientation to illustrate the preferred method for charging the present device.

Referring now to the drawing and first to FIGS. 1 and 2 thereof, the preferred form of the dosimeter of the present invention includes an elongated generally cylindrical housing shell indicated generally at 10 and made of a suitable material such as a plastic, light metal or the like having sufficient strength to hold the component parts of the present device in assembled relation and desirably being substantially transparent to gamma radiation to be measured by the present device. The device 10 may be generally of the size and shape of the small fountain pen or the like and is intended to be carried in the pocket of a user or otherwise attached to the user's clothing by suitable means as the spring-biased clip indicated generally at 12 having a curved base portion 14 received in an undercut recess 16 of the body shell 10 and partially encircling the shell in order to retain the clip proper in operative position as shown.

Within the hollow housing shell 10 there is mounted means forming a hollow ionization chamber. Such means are here exemplarily shown as including (see FIG. 2) a substantially conical body indicated generally at 20 and provided with an inner side wall 22 of generally frustoconical contour merging at its smaller end in a substantially hemispherical portion 24. The chamber formed within the body 20 is closed at the larger end by a cap or cover indicated generally at 26 having an annular lip 28 fitting tightly around the end 30 of the body 20. The chamber of body 20 is desirably hermetically sealed to protect the interior of the body 20 from contamination with moisture or the like, and there is desirably provided an annular polyethylene gasket 32 sealed between the lip 28 and an outwardly extending peripheral shoulder 34 formed integrally with the body 20. Thus an annular raceway 37 is formed within the chamber 20 and spherical indicating elements 35 move therein. A transparency including indicia constituting a reticle is mounted upon the outer surface of the cap 26 and is indicated generally at 36. The reticle 36 and the cover 26 are held against an internal shoulder 38 formed in the shell 10. Means are provided for retaining the parts in their assembled relation as indicated, such means including a spacer collar 40 bearing at its right end against the shoulder 34 of the body 20 and at its left end abutting against a light-diffusing element 42 which in turn is held in place by suitable retaining means such as retainer nut 44 threadedly received in the open end of the shell 10.

Means are provided at the end of shell 10 opposite to the ionization chamber 20 for facilitating the optical examination of the position of the spherical indicating elements 35 within the raceway 37. In the present illustrative embodiment of the invention such means include lens 50 and an eye-piece member 52 having a central aperture 54 formed therein. A retainer nut 56 similar to the retainer 44 previously referred to is threadedly received in the open end of the shell 10 and serves to retain the lens 50 and the eye-piece 52 in assembled relation as shown, with the lens 50 in abutment against the internal shoulder 58 of the shell 10. The lens 50 is of such strength and is so positioned that the reticle 36 and indicating elements 35 in raceway 37 are seen in focus when the user holds the device with the eyepiece end to his eye and with light from a suitable source entering the opposite end.

Indicating elements 35 are preferably identical to one another and in any event are of such material as to acquire electrostatic charges of the same polarity when the elements are moved within chamber 20. The present device depends for its operation upon the mutual repulsive force existing between indicating elements resulting from such electrostatic charge. After the device has been initially charged, it is important for accuracy of reading that further movement of the balls be minimized to prevent inadvertent partial recharging. Means are accordingly provided in accordance with the present invention for selectively locking the balls during the time when no reading is being taken and for selectively releasing the balls when a reading is to be taken. In the present form of the invention such means are shown as including a bar magnet 60 mounted in a carrier indicated generally at 62 (see FIG. 4), the carrier including a pair of arcuately formed arms 63 and 64 adapted to at least partially encircle the body of the shell 10, the arms joining at the center of the carrier to form a generally rectangularly shaped portion 65 in which the magnet 60 is clamped. A longitudinal groove 67 is formed in the outer surface of the shell 10 and serves to slidably receive the base portion of the magnet 60 to guide the movement of the magnet longitudinally of the shell. Since the spherical indicating elements 35 of the present device are desirably made of ferromagnetic material, preferably soft iron, so that they do not become permanently magnetized during operation, it will be readily understood that when the magnet 60 is moved into the locking position or leftwardly as seen in FIGS. 1 and 2, the magnetic attraction exerted by the magnet will cause the spherical members 35 to be retained together in as close relation to the magnet itself as possible. Such a position is seen in FIG. 4, the strength of the magnet 60 being sufficient to hold the two indicating elements 35 in fixed juxtaposed relation, since the strength of the magnet 60 is selected to override the electrostatic repulsive force tending to separate the elements. In order to make certain that the magnet, when in locking position, will not be inadvertently moved therefrom, there is desirably provided a recessed groove 68 undercut on the outer surface of the shell 10 and of sufficient dimension longitudinally of the shell to receive the resilient arms 63 and 64 of the magnet carrier 62 when the magnet keeper is in its forward or locking position.

The reticle 36 mounted upon the outer face of the transparent cap or cover 26 is provided with suitable indicia by which to visually measure the amount of separation between the indicating elements 35 resulting from the balance between the electrostatic repulsive force existing between the elements and the force of gravity. Such indicia may take the form shown in the present illustrative embodiment of the invention including a plurality of radially disposed angularly spaced lines indicated generally at 70, the lines desirably including several lines 72 of increased length by which to facilitate the reading of the spacing between the indicating elements. For example, in FIG. 3 the indicating elements or spherical members are shown as being spaced apart by five small divisions or one large division between the major lines 72, and this may be assumed to indicate fully charged condition. If in a given device this indicates a total charge of one roentgen, then the charge corresponding to the spacing of the indicating element 35 by one of the small divisions would be 200 milliroentgens. Thus, the condition of the spherical members 35 as shown in FIG. 3 indicates that the device has been substantially fully charged and that virtually no ionizing radiation has traversed the ionization chamber, while FIG. 3A shows a fragmentary view of the scale and the indicating elements as seen projected thereagainst where substantially four-fifths of the total charge originally created in the instrument has been discharged by ionizing radiation. This indication is thus that only one-fifth of the original total charge remains to be discharged by subsequent ionizing radiation. Otherwise stated, assuming FIG. 3 indicates fully charged condition for an instrument having a range of one roentgen, the indication as seen in FIG. 3A is that the device has been subjected to 800 milliroentgens of ionizing radiation and will be substantially completely discharged by another 200 milliroentgens.

In this connection it is to be noted that the instrument is intended to be read with its longitudinal axis held in substantially horizontal orientation. Obviously readings will vary if the axis is otherwise oriented. This fact provides an advantage in use in the following respect. When the instrument, held horizontally, indicates full discharge (indicating elements in contact with one another), the question arises whether the instrument may actually have been over-discharged by exposure to a cumulative dosage greater than its nominal range. This can be readily resolved by tilting the instrument axis toward the vertical. Since the weight vector urging the indicating elements together is effectively decreased by such orientation, the spheres may actually be moved apart by a small residuum of electrostatic force. If however the spheres remain in contact when the axis is tilted at 70° to the horizontal, the instrument indicates an over-exposure to ionizing radiation of at least approximately 20% of the nominal range.

The device of the present invention is charged by holding it with the major axis of the instrument vertical and the circular portion 24 of the ionization chamber 20 downwardly as indicated in FIG. 5. Under these conditions, the indicating elements 35 can be shaken out of the raceway 37 into the lower circular portion 24 of the chamber. With the balls so disposed, the entire device is charged by moving it back and forth as indicated by arrow 80 through an excursion of a small distance—say one inch or so—for a sufficient number of times so that the indicating members are spaced apart by reason of electrostatic repulsion by the distance indicated in FIG. 3 and a saturation condition is thus reached. The number of such oscillatory movements may range from approximately 100 to 200 or 300 depending upon the physical constants of the instrument. During the oscillatory charging movements the balls are caused to rise upwardly along the side walls 22 of the chamber 20 as indicated by the phantom representations in FIG. 5. It will be readily understood that after the instrument has been completely charged and has then been partially discharged by exposure to ionizing radiation, it is of the greatest importance in the interest of accuracy in readings that the balls not be permitted to move about in the ionization chamber, and thus the importance of the magnetic keeper 60 will be well understood.

Accordingly there is here provided a device of light weight, simple construction which may be readily carried on the person and which will measure the cumulative dosage of ionizing radiation to which the instrument has been subjected over a period of time. It is to be especially noted that malingering by means of the present device is virtually impossible since any tampering by the user with the device such as moving the magnetic keeper into release position will serve only to partially recharge the instrument and thus effectively to indicate that the user has been subjected to less ionizing radiation than is the fact. By the use of material for the body 20 of very high resistivity, leakage discharge is held to a value of about 1/100 of 1% per day so that the instrument can be used over a long period of time without adversely affecting its accuracy to an objectionable degree.

It will be readily understood that the exact dimensions and relationships illustratively shown in the preferred embodiment of the invention herein can be varied within wide limits without departing from the spirit of the invention which is to be interpreted in the light of the scope of the appended claims.

I claim:
1. In a radiation dosimeter, in combination: means forming a hermetically sealed chamber, the inner walls of the chamber being dielectric and including an annular translucent raceway portion; an ionizable medium within the chamber; a pair of indicating elements within the chamber and movable therein, the indicating elements being electrostatically chargeable in the same polarity relative to the dielectric chamber walls; and indicia adjacent said translucent raceway portion whereby the spacing between the indicating elements movable therealong can be visually observed and measured.

2. The invention as stated in claim 1 including externally operable means for selectively locking said elements against movement within the chamber.

3. The invention as stated in claim 1 including an optical lens having said translucent portion and said indicia within its field of view for facilitating observation of the movable elements in relation to said indicia.

4. The invention as stated in claim 3 including an elongated housing in which said chamber forming means, indicia and lens are mounted, said elements are ferromagnetic and including a magnet carried by the housing and selectively movable relative thereto between a locking position in magnetic relation with said elements and a release position out of magnetic relation therewith.

5. The invention as stated in claim 1 wherein said elements are ferromagnetic and including a magnet selectively movable relative to the chamber forming means into and out of magnetic relation with said elements.

6. A radiation dosimeter comprising: a hollow body having a chamber formed therein defined by walls of dielectric material, said chamber containing an ionizable gas; means forming within said chamber an annular sphere-receiving raceway; a pair of electrostatically chargeable spheres received in said raceway and movable therealong, said spheres being at least partially ferromagnetic and being visible from without the raceway; and magnet means selectively movable into locking position magnetically retaining said spheres immobilized or into release position out of effective magnetic relation with the spheres.

7. The invention as stated in claim 6 wherein the locked position of the magnet means is in substantial alignment with the plane containing the annular raceway.

8. The invention as stated in claim 7 wherein said chamber includes a portion having a frusto-conical side wall merging with a concave end section.

9. In a radiation dosimeter: a hollow body having a continuous annular raceway formed therein defined by electrically non-conductive walls, the raceway including a portion having an extended concave surface; an ionizable gas in said raceway; a pair of electrostatically chargeable elements movably housed in the raceway and visible outwardly thereof; and means for observing the distance between said elements when resting upon the concave surface, said surface being upwardly directed.

References Cited in the file of this patent

UNITED STATES PATENTS

| | | |
|---|---|---|
| 2,638,552 | Landsverk | May 12, 1953 |
| 2,683,222 | Failla | July 6, 1954 |
| 2,731,568 | Failla | Jan. 17, 1956 |
| 2,741,706 | Futterknecht | Apr. 10, 1956 |
| 2,761,073 | Carlbom et al. | Aug. 28, 1956 |
| 2,805,345 | Warmoltz | Sept. 3, 1957 |
| 2,852,695 | Argabrite | Sept. 16, 1958 |